United States Patent [19]

Miranker

[11] Patent Number: 4,935,849
[45] Date of Patent: Jun. 19, 1990

[54] CHAINING AND HAZARD APPARATUS AND METHOD

[75] Inventor: Glen S. Miranker, San Francisco, Calif.

[73] Assignee: Stardent Computer, Inc., Sunnyvale, Calif.

[21] Appl. No.: 194,458

[22] Filed: May 16, 1988

[51] Int. Cl.$^5$ .......................................... G06F 11/28
[52] U.S. Cl. ................................... 364/730; 364/736; 364/200; 371/69.1
[58] Field of Search ............... 364/736, 730, 740, 741, 364/737, 200 MS File, 900 MS File; 371/69

[56] References Cited

U.S. PATENT DOCUMENTS

| | | | |
|---|---|---|---|
| 4,339,808 | 7/1982 | North | 364/900 |
| 4,532,589 | 7/1985 | Shintani | 364/200 |
| 4,594,655 | 6/1986 | Hao | 364/736 X |
| 4,768,148 | 8/1988 | Keeley | 364/200 |
| 4,777,592 | 10/1988 | Yano | 364/736 X |
| 4,777,593 | 10/1988 | Yoshida | 364/736 X |
| 4,789,925 | 12/1988 | Lahti | 364/730 X |

Primary Examiner—Jerry Smith
Assistant Examiner—Robert W. Beausoliel
Attorney, Agent, or Firm—Blakely, Sokoloff, Taylor & Zafman

[57] ABSTRACT

An apparatus and method for detecting data conflicts in a computer system and for throttling execution of instructions where data conflicts exist. The present invention comprises circuitry for detecting data conflict problems in a computer system. The circuit of the present invention comprises a plurality of registers associated with each processor in the system. The registers are used to store a range of elements to be written by the associated processor and a plurality of ranges of elements to be read by the associated processor. These ranges are then compared against data accesses by other processors in the computer system and where a data conflict exists, a circuit is provided for determining which processor will be allowed to continue processing and which processor will be prevented from continuing processing. The circuitry ensures the processor completes processing of instructions in a logical manner giving expected results.

12 Claims, 4 Drawing Sheets

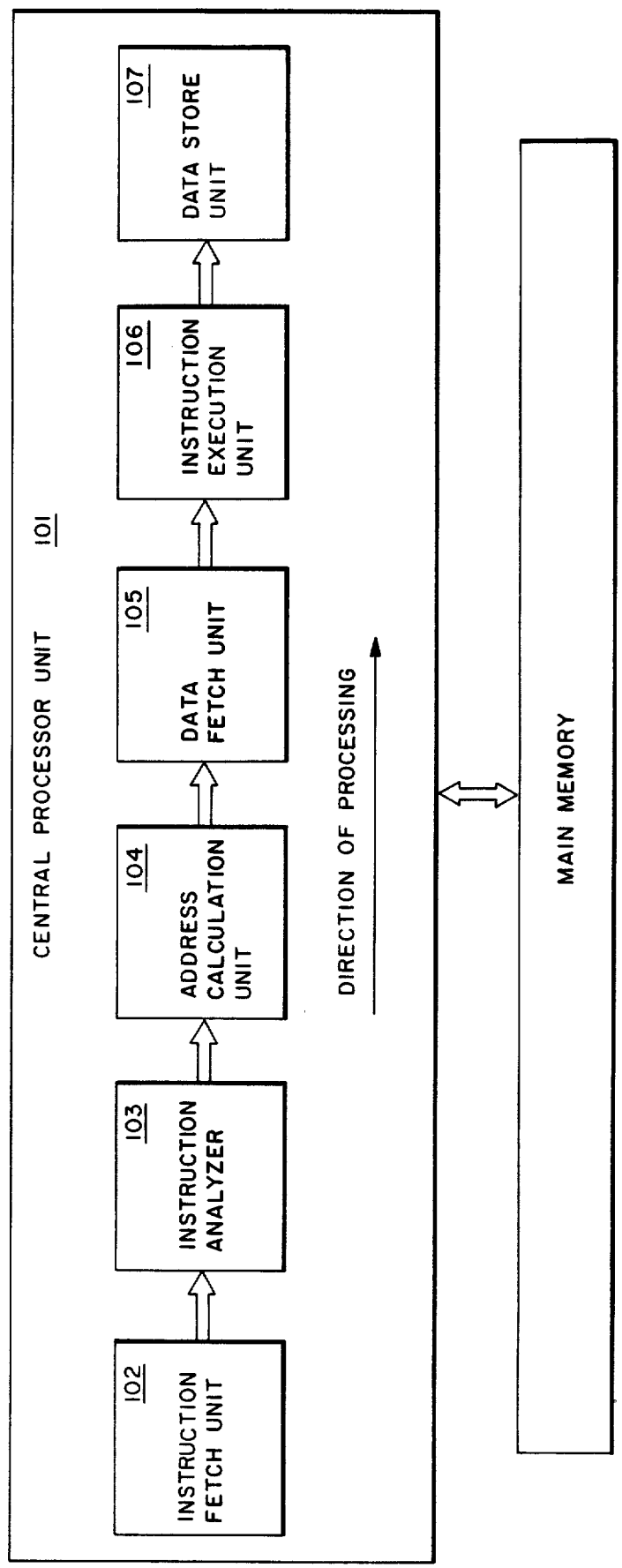
FIG.―1 (PRIOR ART)

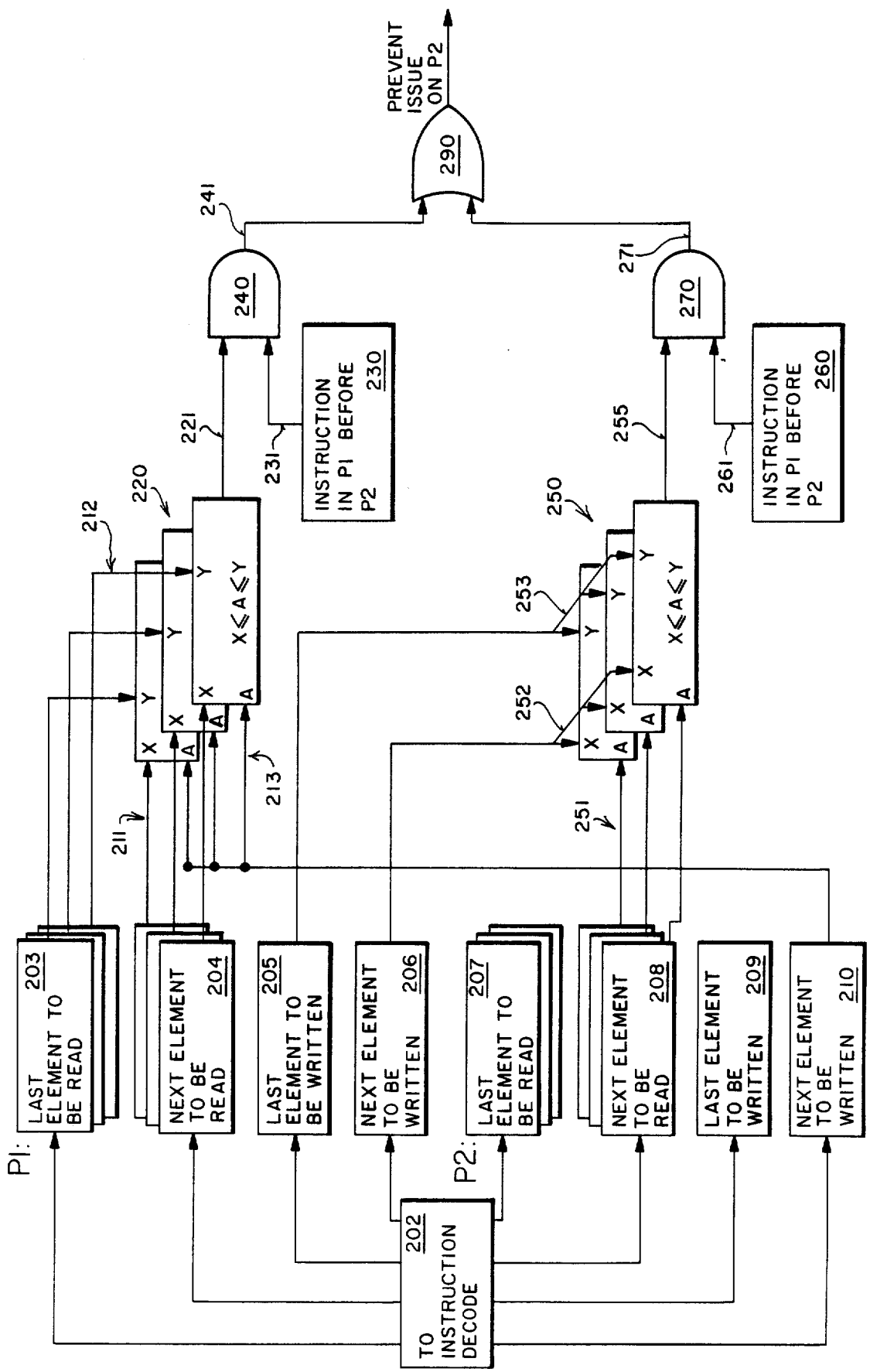
FIG_2

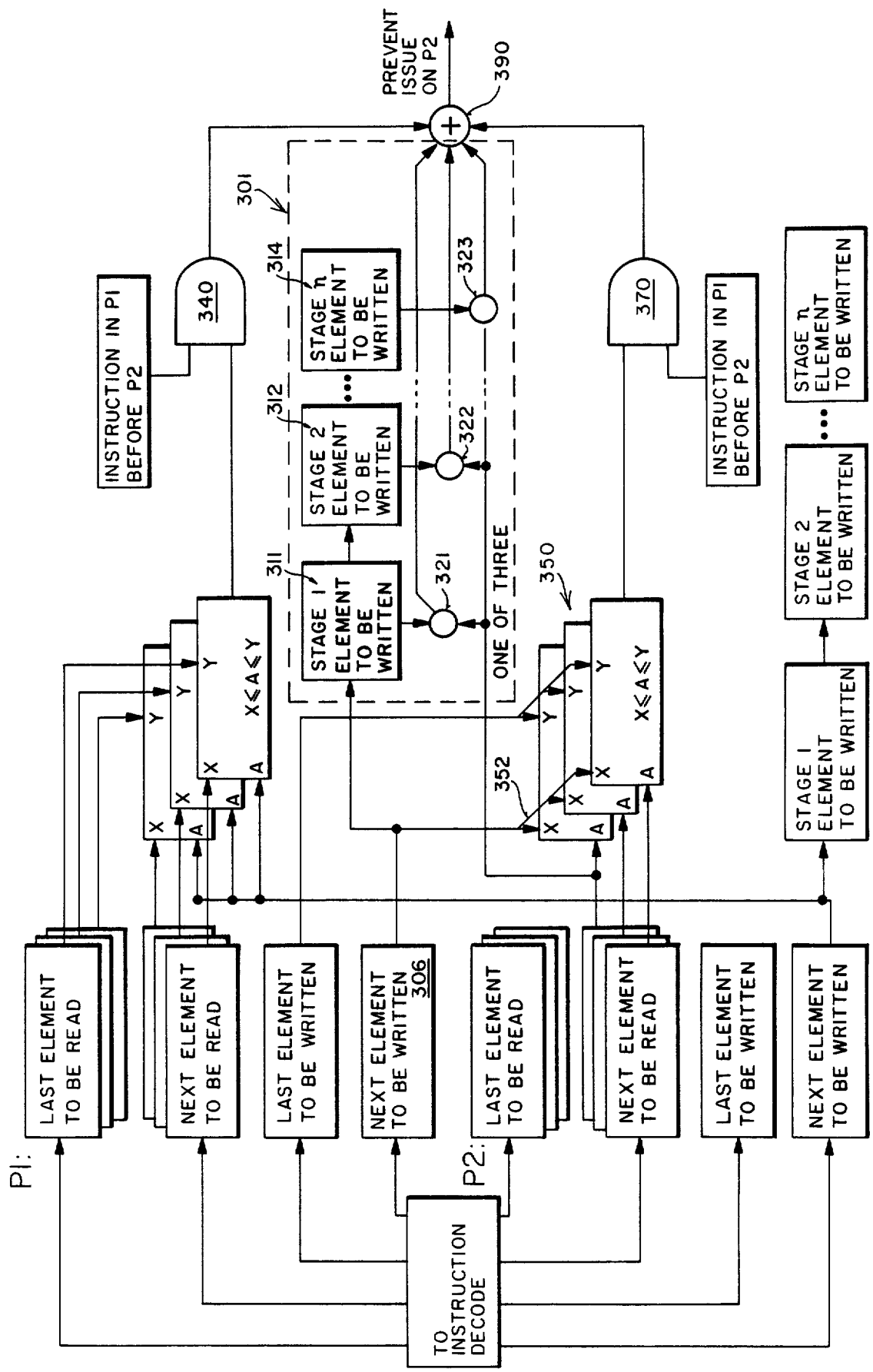

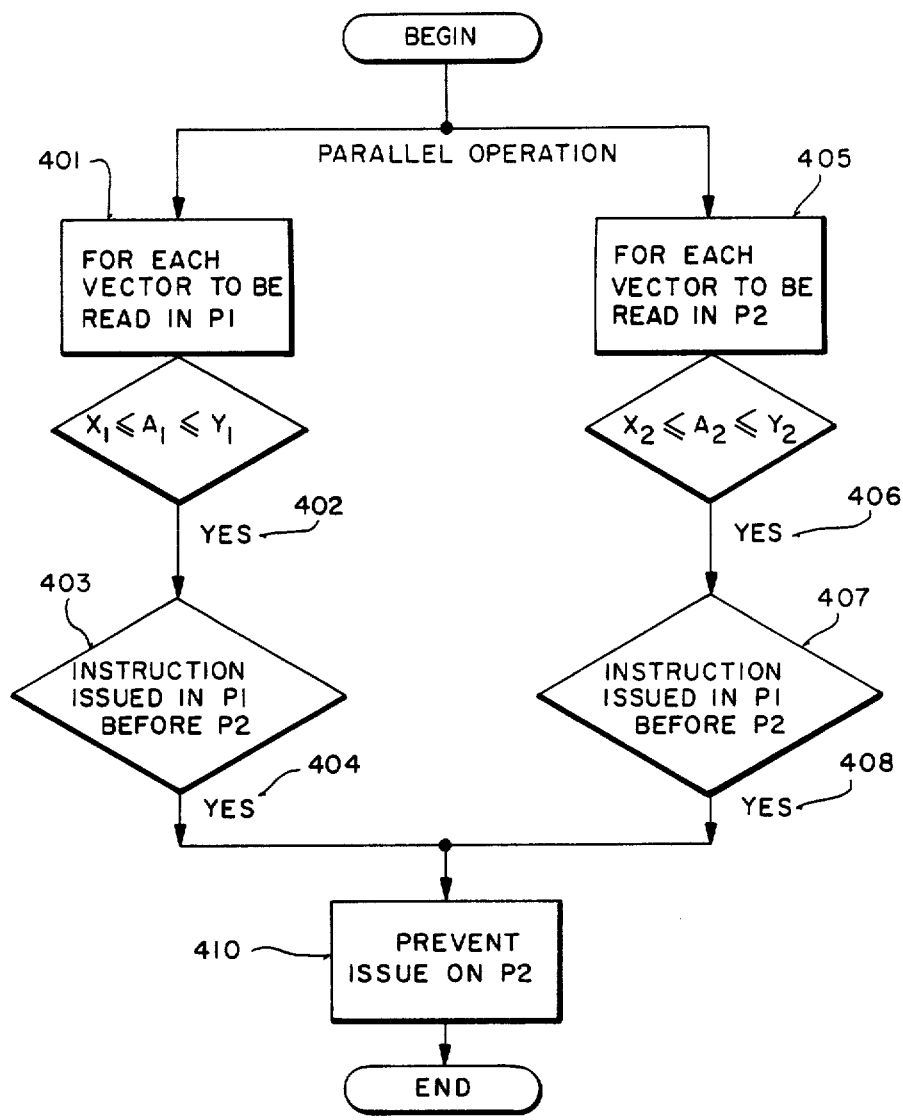
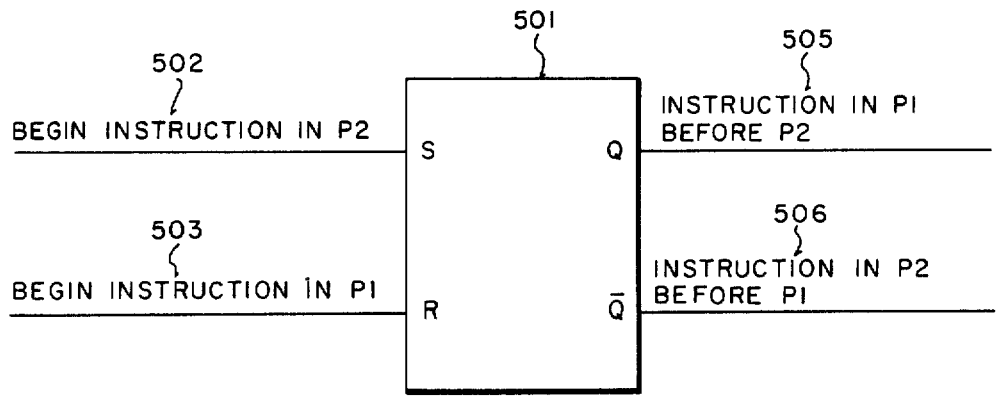

CHAINING AND HAZARD APPARATUS AND METHOD

BACKGROUND OF THE PRESENT INVENTION

1. Field of the Invention

The present invention relates to the field of concurrent processing of operations in a computer system with specific application to vector processing computer systems.

2. Prior Art

In many known computer systems, multiple processors are utilized to execute instructions. In such systems, it is often desired to execute instructions from a single process in parallel or concurrently. For example, it may be desired to execute an instruction sequence such as:

LOAD R5, memory

ADD R3, R2, R1 on two separate processors, the first processor loading register 5 from memory and the second processor adding the contents of register 3 and register 2, giving register 1 as a result.

Parallel or concurrent processing of instructions is relatively simple when the instructions do not share common data. Such instructions may be said to be disjoint or independent.

However, it may be desired to execute an instruction sequence such as:

LOAD R1, memory

ADD R3, R2, R1 on two separate processors. In such an instruction sequence, the contents of register 1 after execution of the instructions may depend on the relative speed of processing the two instructions if the instructions are processed concurrently.

For example, consider two concurrent instructions issued at $clock_n$ and $clock_{n+k}$ ($k>0$), both referencing a common cell A. If the first instruction produces a result needed by the second instruction, then the second instruction is said to have a chain dependency on the first. In such a case, the execution of the second instruction must be delayed until the first instruction completes its write of A. The completion of writing A may be termed "clearing" the conflict.

If both instructions write A, then a data "hazard" exist and the instructions must complete in the order issued. If the first instruction reads location A and the second instruction writes to location A, then a data "hazard" also exists and the actions must proceed in time such that the read of A by the first instruction proceeds the write of A by the second instruction. These data conflicts are summarized in Table I below:

TABLE I
CHAINING AND HAZARD DEFINITION

| FIRST ACTION | LATER ACTION READ | LATER ACTION WRITE |
|---|---|---|
| | A | A |
| READ A | NO CONFLICT | DATA HAZARD |
| WRITE A | CHAINING CONFLICT | DATA HAZARD |

A number of methods and apparatus for solving such a concurrency problem are known in the art. For example, some programming languages allow for the programmer to code instructions to avoid data conflict problems posed by concurrent execution of instructions. An example of such a programming language is Concurrent SP/k (CSP/k), which is the SP/k subset of PL/I, extended with concurrency constructs. In CSP/k, the constructs are called monitors and are implemented around critical pieces of code. An example of CSP/k compiler that runs on an IBM system 360/370 was developed by the University of Toronto, Toronto, Ontario, Canada.

A number of other methods including use of specialized circuitry and hardware and software semaphores are known for implementing concurrent and parallel processings of instructions.

Processing of concurrent instructions is further complicated in a computer system having multiple processors in which the processor organization is a pipeline machine. With reference to FIG. 1, pipeline machines generally comprise one or more central processor units 101 having a plurality of separate units to execute each step of an instruction. For example, an instruction fetch unit 102 may fetch an instruction to be executed. An instruction analyzer unit 103 may decode the fetched instruction and the instruction fetch unit 102 may fetch a second instruction. An address calculation unit 104 determines if the initial instruction needs data from memory and the address of such data while the instruction analyzer 103 is decoding the second instruction and the instruction fetch unit is fetching a third instruction. A data fetch unit 105 may then fetch data from memory for the first instruction and an instruction execution unit 106 will subsequently execute the instruction. A data store unit 107 may then store a result in memory. Each instruction follows through each step down the pipeline.

In a computer system utilizing pipeline machines and concurrent or parallel processing it is important to examine data affected by each stage of the pipeline when determining if data conflicts exist.

Therefore, it is desired to develop a method and apparatus for determining whether data conflicts exist and for throttling execution of instructions where such conflicts exist in a computer system utilizing concurrent and parallel processing.

It is further desired to develop a method and apparatus for detecting data conflicts and for throttling execution of instructions where data conflicts exist in a computer system utilizing a plurality of processors having a pipeline architecture.

SUMMARY OF THE PRESENT INVENTION

The present invention relates to an apparatus for detecting data conflicts in a computer system and for throttling execution of instructions where data conflicts exist. The present invention comprises a circuit in which each pipeline reading data is compared against all pipelines writing data to determine whether data conflicts exist. Further each pipeline writing data is compared against all pipelines writing data and all pipelines reading data. The present invention discloses circuitry for comparing the interval of data which is to be accessed by a pipeline against intervals of data to be accessed by other pipelines and circuitry for comparing a single element to be accessed in a pipeline against a single element of data in other pipelines. The comparators of the present invention for comparing against a single element of data are especially useful where an element to be written has advanced into the pipeline and is currently being executed by one of the stages of the pipeline.

The present invention further discloses circuitry for determining the ordering sequence of instructions. This circuitry is utilized when it is determined that a data conflict exists, to determined which pipeline is allowed to continue processing and which pipeline will be throttled or be prevented from processing.

BRIEF DESCRIPTION OF THE DRAWINGS

FIG. 1 is a block diagram illustrating a known pipeline architecture.

FIG. 2 is a block diagram illustrating a circuit as may be utilized by the present invention for detecting data conflicts.

FIG. 3 is a block diagram illustrating the circuit of FIG. 2, including further circuitry as may be utilized in a pipeline architecture.

FIG. 4 is a flowchart illustrating a method for detecting data conflicts as may be utilized by the present invention.

FIG. 5 is a circuit diagram illustrating a circuit as may be utilized in the present invention for determining the sequence of instructions.

DETAILED DESCRIPTION OF THE PRESENT INVENTION

A method and apparatus for detecting data conflicts in a computer system is described. In the following description, numerous specific details are set forth such as specific circuit types, etc., in order to provide a thorough understanding of the present invention. It will be obvious, however, to one skilled in the art that the present invention may be practiced without these specific details. In other instances, well-known circuits and structures have not been shown in detail in order not to unnecessarily obscure the present invention.

The present invention discloses a method and apparatus for detection of data conflicts in a computer system and has particular application in a computer system utilizing multiple processors with a pipeline architecture. The present invention further has particular application in a vector processing computer system. Typically, data conflicts arise in a multiple processor computer system when two or more processors executing concurrent code attempt to access a common data cell. For example, a first processor may execute a first instruction which produces a result A. The result A may be required by a second instruction executing concurrently on a second processor. In such a case the second instruction is said to have a chain dependency on the first instruction. Referring to Table II, if instruction 1 (a=b+c) is processed on a first processor and instruction 2 (d=a+e) is processed on a second processor, a chain dependency is said to exist. Instruction 1 computes A which is required by instruction 2. Therefore, the execution of instruction 2 must be delayed until instruction 1 completes its write of A.

A data hazard is said to exist where two instructions attempt to update a common data cell. For example, if instruction 3 (a=f+g) is executed on a first processor and instruction 4 (a=g+h) is executed on a second processor, the execution of instruction 4 must be delayed until instruction 3 completes its update of data cell A. Further, in this specific example, the execution of instruction 4 must be delayed until the PRINT A instruction is completed. The PRINT A instruction illustrates a second example of a data hazard. This type of data hazard occurs where a first instruction reads a data cell that a second instruction attempts to update. This type of data hazard is also illustrated with reference to instructions 5 and 6. If instruction 5 (h=a+2) is executed on a first processor and instruction 6 (a=a−1) is executed on a second processor, the execution of instruction 6 must be delayed until completion of a read of data cell A by the processor executing instruction 5.

TABLE II

| | |
|---|---|
| A = B + C | ← INSTRUCTION 1 |
| D = A + E | ← INSTRUCTION 2 |
| A = F + G | ← INSTRUCTION 3 |
| PRINT A | |
| A = G + H | ← INSTRUCTION 4 |
| H = A + 2 | ← INSTRUCTION 5 |
| A = A − 1 | ← INSTRUCTION 6 |

The preferred embodiment of the present invention comprises a vector processing computer system in which an instruction may access a vector at a time when doing computations. Further, the computer system of the preferred embodiment allows for cell level addressibility of vectors in the system. The computer system of the present invention is further disclosed in U.S. patent application Ser. No. 162,738, Filed Mar. 1, 1988, entitled "Vector Register File", assigned to the assignee of the present invention and is incorporated here by reference.

The preferred embodiment of the present invention detects data conflicts, both data hazards and chain dependencies, and controls execution of instructions such that a logical result is achieved. The preferred embodiment of the present invention detects such data conflicts in a vector processing computer system utilizing a plurality of pipes which may effect data. Further, the preferred embodiment of the present invention will detect data conflicts in a computer system which allows for cell level addressability of a vector register.

Referring now to FIG. 2, a block diagram of a circuit as may be utilized by the present invention is disclosed.

Instruction decode circuitry 202 loads the address of the last element of each vector to be read by a first processor into a first plurality of registers 203 and loads the address of the next element of each vector to be read by the first processor into a second plurality of registers 204. The decode circuitry 202 loads the address of the last element of a vector to be written into a third register 205 and the address of the next element of the vector to be written into a fourth register 206.

For example, if an instruction such as:

ADD VR1, VR2, VR3 is executed on the first processor, indicating vector register 1 is to be added to vector register 2 yielding a result vector register 3, the instruction decode circuitry 202 initiates the following action:

(1) The memory address of the last element in VR1 is loaded into one of the last elements to be read registers 203;

(2) The memory address of the first element of VR1 is loaded into one of the next element to be read registers 204. The particular register is chosen to correspond to the last element to be read register 203 holding the memory address of the last element of VR1;

(3) The memory address of the last element of VR2 is loaded into a second of the last element to be read registers 203;

(4) The memory address of the first element of VR2 is loaded into a second of the next element to be read registers 204. The particular register is chosen to correspond to the last element to be read register 203 holding the memory address of the last element of VR2;

(5) The memory address of the last element of VR3 is loaded into the last element to be written register 205 and the memory address of the first element of VR3 is loaded into the next element to be written register 206.

Registers 207, 208, 209 and 210 are loaded similarly for a second processor executing a second instruction. The second instruction may logically follow the first instruction in a process being executed.

The circuitry disclosed by FIG. 2 yields as an output a stall signal 290 for preventing issue of an instruction in the second processor.

As described in more detail with reference to FIG. 4, comparator circuit 220 determines, for each vector to be read by the first processor, whether the next element to be written by the second processor falls in a range of addresses bounded by the next element to be read of the vector and the last element to be read of the vector, block 401. In block 401, $X_1$ refers to the next element of the vector to be read, $Y_1$ refers to the last element of the vector to be read and $A_1$ refers to the next element of the vector to be written. If the address of the next element of the vector to be written falls within this range, branch 402, it is determined whether the instruction issued in processor 1 before issuing in processor 2, block 403. If the instruction did issue in processor 1 before issuing in processor 2, branch 404, the instruction on processor 2 is not allowed to continue processing during the current clock cycle, block 410.

Similarly, in parallel with the operation described above for comparator circuit 220, comparator circuit 250 determines for each vector to be read in the second processor, whether the next element to be read by the second processor ($A_2$) falls in a range of addresses bounded by the next element to be written by the first processor ($X_2$) and the last element to be written by the first processor ($Y_2$), block 405. If it does, branch 406, a comparison is done to determine if the currently executing instruction was issued in the first processor before the currently executing instruction was issued in the second processor, block 407. If so, branch 408, the instruction on processor 2 is prevented from continuing processing during the current clock cycle, block 410.

Referring again to FIG. 2, circuity implementing the process of FIG. 4 will be described. The next element to be read of each vector in processor 1, stored in registers 204, is applied to a X-input 211 of comparator circuit 220. The last element of each vector register to be read, stored in registers 203, is applied to the Y-input 212 of comparator circuit 220. The next element to be read and the last element to be read of each of the other vectors being read by processor 1 are applied to corresponding X and Y-inputs of comparator circuit 220. The next element to be written by the second processor, stored in register 210, is applied to the A-input 213 of comparator circuit 220.

Comparator circuit 220 compares for each X and Y-input to determine if the address on the A-input is less than or equal to the address on the Y-input and whether the address on the X-input is less than or equal to the address on the A-input.

If the A-input falls within the interval of addresses bounded by the X-input and the Y-input of any of the vector registers read by processor 1, the output signal 221 of comparator circuit 220 is brought high. Circuit 230 provides a signal on line 231 indicating whether the instruction executing on processor 1 or the instruction executing on processor 2 was logically issued first. A high signal is provided if the instruction in processor 1 began execution first and a low signal is provided if the instruction in processor 2 began execution first.

Referring briefly to FIG. 5, the circuitry utilized by the preferred embodiment for determining logical instruction sequence is illustrated. The preferred embodiment utilizes and S-R flip-flop 501 having as an input to the set (S) input 502 of the flip-flop a signal indicating an instruction is beginning execution in processor 2. The input to the reset (R) input 503 is a signal indicating an instruction is beginning execution in processor 1. As a result, the output 505 is high when an instruction began execution in processor 1 before the instruction executing in processor 2. The $\overline{Q}$ output 506 is high when an instruction began execution in processor 2 before the instruction executing in processor 1. Therefore, in the block diagram of FIG. 2, the Q ouput 505 of the S-R flip-flop 501 is utilized as the output signal 231 from circuit 230.

The output signal 231 of circuit 230 and the output signal 221 of circuit 220 are utilized as inputs to AND gate 240. The output of AND gate 240 on line 241 is used as an input to OR gate 290. Utilizing the described circuitry, it may be determined whether an instruction to write an element by processor 2 should be prevented from issuing during the current clock cycle.

Utilizing similar circuitry, elements to be read by processor 2 are examined and it is determined whether to prevent issue of an instruction to read such elements.

The next element to be read in each vector of processor 2 is stored in registers 208. The contents of these registers are applied to the A-inputs 251 of comparator circuit 250. The next element to be written by processor 1 is stored in register 206 and is applied to each of the X-inputs 252 of comparator circuit 250. The last element to be written by processor 1 is stored in register 205 and is applied to the Y-inputs of comparator circuit 250. A comparison is then done to determine whether the next element to be read of any of the vector registers to be read by processor 2 (A-input) falls in the range of addresses bounded by the next element to be written by processor 1 (X-input) and the last element to be written by processor 1 (Y-input). If any of the A-inputs 251 falls in the range bounded by the X-input and the Y-input, the output signal 255 of comparator circuit 250 is brought high. Circuit 260 provides a signal on line 261 indicating whether the instruction executing on processor 1 or the instruction executing on processor 2 is logically issued first. Circuit 260 utilizes the same circuitry as circuit 230 described in detail in connection with FIG. 5. Line 261 utilizes the Q output 505 of the S-R flip-flop 501. Lines 255 and 261 are used as inputs to AND gate 270. The output signal 271 of AND gate 270 is high if any of the addresses of elements to be read by processor 2 fall within the range of elements to be written by processor 1 and the instruction executing in processor 1 was issued before the instruction executing in processor 2. Line 241 and line 271 are used as inputs to OR gate 290. Utilizing the described circuitry, it is determined whether a data contention problem exists with either writing of data by processor 2 or reading of data by processor 2.

A symmetrical circuit produces a signal for preventing issue of an instruction on the first processor. Further, the circuitry of FIG. 2 and its symmetrical pair are duplicated for each pair of processors in the computer system of the preferred embodiment. Thus, in a computer system utilizing four processors six pairs of symmetrical circuitry occur. If the processors are labeled A through D, then the following parings may exist: AB and BA, AC and CA, AD and DA, BC and CB, BD and DB, CD and DC. In general, a computer system having N processors will have (N−1)! pairs of symmetrical comparator circuits.

Referring to FIG. 3, the block diagram of FIG. 2 is again illustrated further showing circuitry for use in a pipelined computer system. In such a system, when processor 1 writes an element, the execution of such a write may take place through several stages of the pipeline. The address of the element to be written stored in the next element to be written register 306 is applied to a register 311 corresponding to stage 1 of the pipeline at the same time it is applied to the X-inputs 352 of the comparator circuit 350. The present invention discloses the use of a plurality of registers such as registers 311, 312 and 314 corresponding to each of the stages of the pipeline. The address stored in each of these stages corresponds to the address of the element being written at any point and time and being processed by that stage of the processor. The registers 311, 312 and 314 may comprise a shift register or similar apparatus, the shift register having a number of stages equal to the number of stages in the pipeline. The contents of each of these registers are compared to the address of the next element to be read by processor 2 by comparator circuits such as comparator circuits 321, 322 and 323. The output of each of these comparator circuits 321, 322 and 323 is high if the next element to be read by processor 2 is equal to the element currently being processed by the respective stages of the pipeline and is low if they are not equal. The output of these comparator circuits 321, 322 and 323 are used as inputs to the OR gate 390 in addition to the outputs of AND gate 340 and AND gate 370 which are generated as described in connection with FIG. 2. If any of the signals input to OR gate 390 is high the instruction is prevented from issuing on processor 2. Utilizing this circuitry, data contention problems are prevented in a pipelined computer architecture.

Thus, an apparatus and method for detecting and preventing data contention problems in a computer system is described.

I claim:

1. A circuit for detecting data conflicts in a computer system, said circuit comprising:
a first storing means for storing a first address, said first address corresponding to a beginning address in a range of addresses to be read by a first processor;
a second storing means for storing a second address, said second address corresponding to an ending address in a range of addresses to be read by said first processor;
a third storing means for storing a third address, said third address corresponding to an element to be written by a second processor;
a first comparator means for comparing said first address and said second address to said third address, said first comparator means coupled with said first storing means, said second storing means and said third storing means.

2. The circuit, as recited by claim 1, further comprising:
a fourth storing means for storing a fourth address, said fourth address corresponding to a beginning address in a range of addresses to be written by said first processor;
a fifth storing means for storing a fifth address, said fifth address corresponding to an ending address in a range of addresses to be written by said first processor;
a sixth storing means for storing a sixth address, said sixth address corresponding to a beginning address in a range of addresses to be read by said second processor;
a second comparator means for comparing said fourth address and said fifth address with said sixth address, said second comparator means coupled with said said fourth storing means, said fifth storing means and said sixth storing means.

3. The circuit as recited by claim 2, further comprising a means for determining order of execution of instructions in said first processor and said second processor.

4. The circuit as recited by claim 3, further comprising a first AND gate, said first AND gate having as inputs said first comparator means and said means for determining order of execution of instructions.

5. The circuit as recited by claim 4, further comprising a second AND gate, said second AND gate having as inputs said second comparator means and said means for determining order of execution of instructions.

6. The circuit as recited by claim 5, further comprising an OR gate, said OR gate coupled with said first AND gate and said second AND gate as inputs, said OR gate producing an output indicating whether processing may continue on said second processor.

7. The circuit as recited by claim 6, wherein said means for determining order of execution of instructions comprises an S-R flip-flop, said S-R flip-flop having as an S input a signal indicating processing is beginning on a new instruction in said second processor and as an R input a signal indicating processing is beginning on a new instruction in said first processor.

8. The circuit as recited by claim 6, wherein said computer said first processor comprises a N stages for execution of instructions, said circuit further comprising:
a shift register means having N stages corresponding to said N stages of said first processor, said shift register means for storing addresses corresponding to elements being written by said first processor;
N third comparator means for comparing addresses stored in said shift register means with said sixth address, said N third comparator means further coupled as inputs to said OR gate.

9. In a computer system having a first processing means and a second processing means, a circuit for determining order of execution of instructions in said first and second processing means, said circuit having as a first input a signal indicating said first processing means is beginning processing of an instruction, said circuit having as a second input a signal indicating said second processing means is beginning processing of an instruction, said circuit producing as an output a signal indicating whether said first processing means or said second processing means began processing of an instruction first.

10. The circuit as recited by claim 9 wherein said circuit comprises an S-R flip-flop.

11. In a computer system having a first processing means for executing a first instruction and a second processing means for executing a second instruction, said first instruction causing said first processor to read a first vector from a memory, said first vector having a beginning element (first element) with an address X1 and an ending element (second element) with an address Y1, said second instruction causing said second processor to write a third element, said third element having an address A1, a method for preventing data conflicts comprising the steps of:

(a) determining if said address A1 falls in a range of addresses bounded by addresses X1 and Y1;

(b) if said address A1 falls in said range of addresses, determining if said first instruction began execution prior to said second instruction;

(c) if said first instruction began execution prior to said second instruction, preventing said second processor from writing said third element.

12. The method as recited by claim 11, wherein said first instruction further causes said first processor to write a second vector to a memory, said second vector having a beginning element (fourth element) with an address X2 and an ending element (fifth element) with an address Y2 and said second instruction further causes said second processor to read from an address A2, said method further comprising the steps of:

(a) determining if said address A2 falls in a range of addresses bounded by X2 and Y2;

(b) if said address A2 falls in said range of addresses bounded by X2 and Y2, determining if said first instruction began execution prior to said second instruction;

(c) if said first instruction began execution prior to said second instruction, preventing said second processor from reading from said address A2.

* * * * *

Disclaimer and Dedication 4,935,849 — Glen S. Miranker, San Francisco, Calif. CHAINING AND HAZARD APPARATUS AND METHOD. Patent dated June 19, 1990. Disclaimer and Dedication filed Dec. 23, 1996, by the assignee, Kubota Graphics Liquidating Trust.

Hereby disclaims and dedicates to the Public all claims of said patent.
*(Official Gazette, April 22, 1997)*